United States Patent Office 3,479,998
Patented Nov. 25, 1969

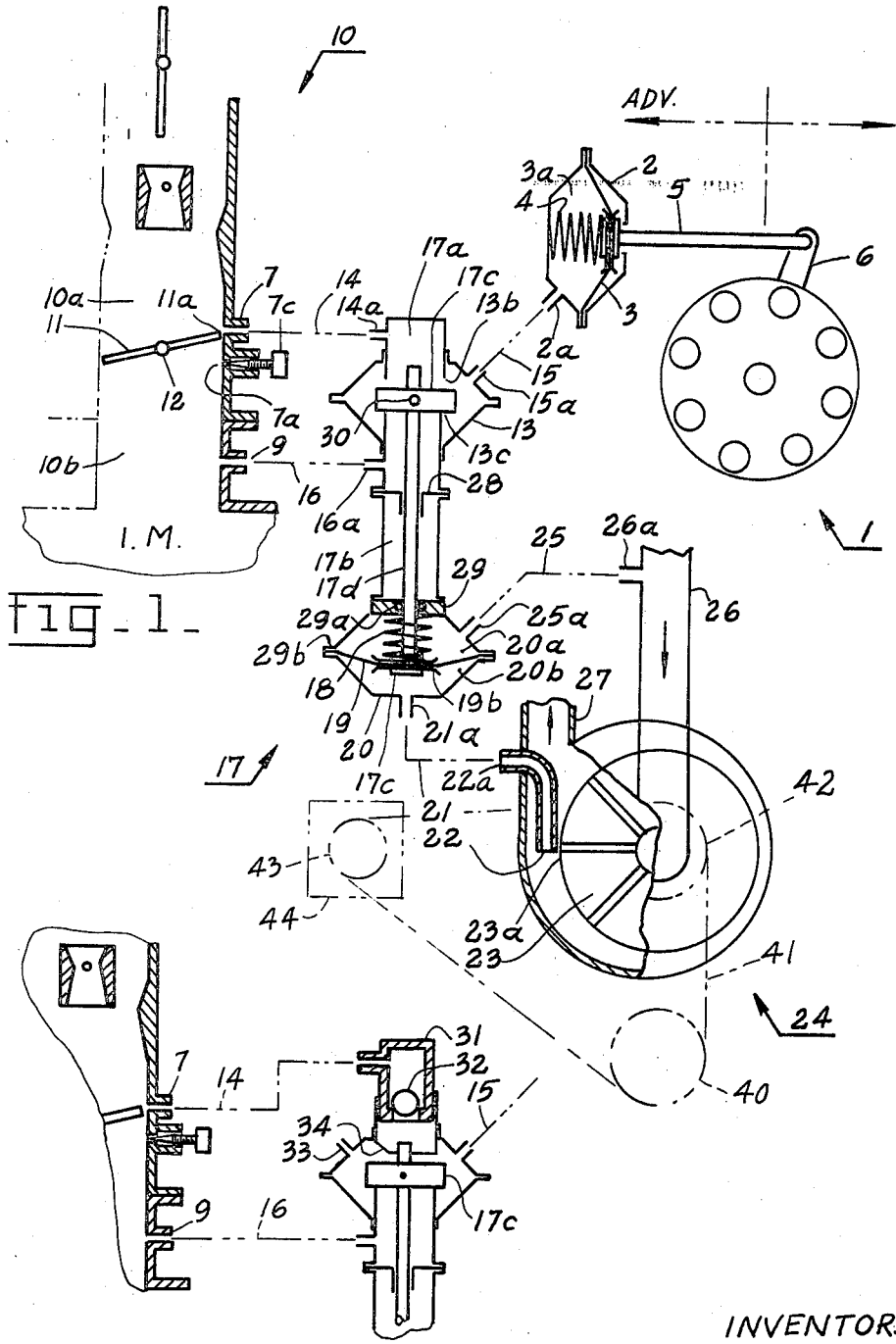

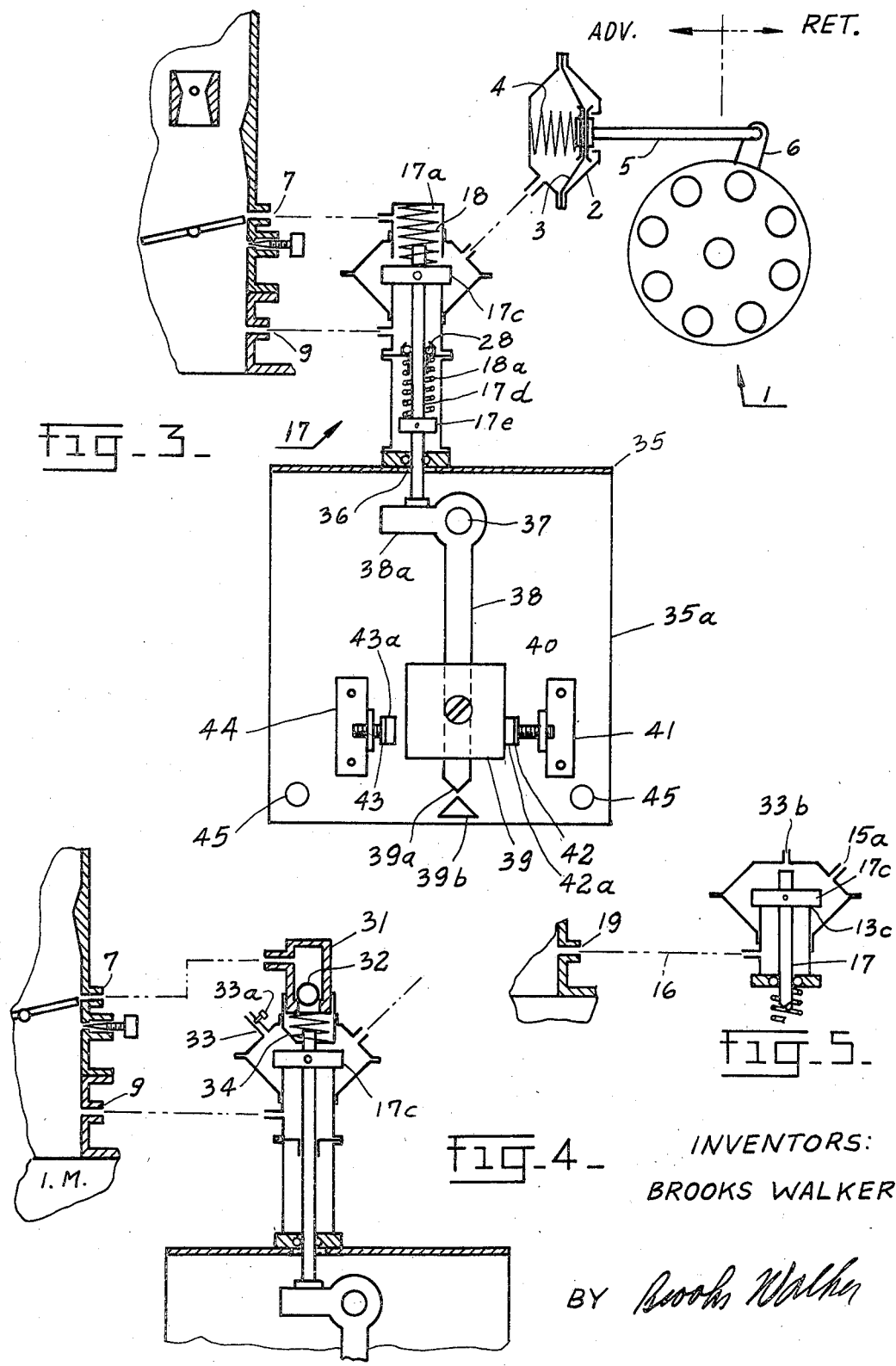

3,479,998
SPARK CONTROL
Brooks Walker, 1280 Columbus Ave.,
San Francisco, Calif. 94133
Filed Mar. 27, 1967, Ser. No. 626,258
Int. Cl. F02d *31/00;* F02p *1/00, 5/06*
U.S. Cl. 123—97                                                    8 Claims

ABSTRACT OF THE DISCLOSURE

An apparatus for controlling the operation of a suction operated spark timing control motor of an internal combustion engine. A pair of longitudinally spaced ports are provided in the main air passage of the carburetor for selective connection to the motor. A pair of conduits connect the ports to a valve and a single conduit connects the valve to the motor. The valve is operated in response to the speed of the engine to connect one or the other of the ports to the motor. The upper port is above the closed position of the throttle valve in the passageway.

---

This invention relates to a device to control the spark timing of an internal combustion engine. More specifically, it controls the spark timing during engine operation conforming to the driving modes of idle and deceleration to reduce auto exhaust pollultants.

It has been well established that the internal combustion engine constitutes a major, if not the major source of air pollution in urban areas. The principal pollutants are carbon monoxide and unburned hydrocarbon due to the incomplete combustion within the engine although other pollutants such as nitrogen oxides, lead compounds and particulate matter (carbon) are important. Further, the amount of pollutants is effected to a large extent by the mode of engine operation (acceleration, deceleration, idle and cruise) and by engine design parameters for mixture ratio, spark timing, combustion chamber design, etc. This invention refers specifically to control of spark timing during the idle and deceleration cycles which are very important themselves but which may also effect other cycles such as cruise if adverse settings for spark timing and/or mixture control are used to obtain an optimum idle for reasons of mechanical smoothness with complete disregard to the pollution problem. Such an adverse idle setting would have "advanced" timing and rich mixtures. The present invention allows lean mixtures to be employed through the use of "retarded" spark timing at idle by means of the intake suction operated spark retard at idle and no "vacuum advance" (suction operated advance) at idle. While this is beneficial for idle, retarded spark timing aggravates the deceleration problem in which large concentration of unburned hydrocarbons in particular are emitted due to a large extent to misfiring under conditions of abnormally high manifold vacuum and resulting low compression pressures and amplified distribution problems between cylinders. Advancing the spark timing by governor advance and full vacuum advance under the conditions of deceleration has been shown to be beneficial in reducing unburned hydrocarbon during deceleration above idle or above a predetermined engine speed.

It should be specifically noted that both idle at idle engine speeds and deceleration above idle speeds or above a higher predetermined engine speed are generally closed throttle operating conditions and conventional means for spark control do not differentiate between these conditions. The engine operating parameters which characterize "deceleration" in the auto exhaust problem as contrasted to "idle" are (a) relatively high engine speed i.e. above about 1000 r.p.m. and (b) abnormally high intake manifold vacuum i.e. above about 20–22" mercury. Therefore, interlocks which will respond to speed or abnormally high vacuum will provide an approximate signal which may be used to effect regulation of spark timing to optimize combustion efficiency and thereby reduce unburned exhaust constituents (carbon monoxide and hydrocarbons) which are a primary cause of the auto "smog" problem.

Devices have been developed which employ "abnormally high vacuum" as the engine parameter to regulate spark timing (advance) during deceleration. While they are successful to a degree one difficulty is that such devices because they operate on the *difference* between atmospheric pressure (barometer reading) and MAP (manifold absolute pressure) they are effected by changes in barometric pressure on altitude changes. The present invention eliminates this problem through the use of an engine speed interlock or sensor instead of an "abnormally high manifold vacuum interlock" to differentiate between the modes of idle and deceleration.

OBJECTS

It is a principal object of the present invention to reduce the amount of pollutants in the exhaust of automobile engines through the control of spark timing at idle and deceleration independently of barometer changes, altitude changes, etc.

It is one object of the invention to provide an improved ignition control arrangement.

It is another object of the invention to provide an ignition control device, particularly adapted to the reduction of smog producing emissions powered by engine developed suction controlled by an engine speed sensor.

It is a third object of the invention to provide improved mechanism for the discrimination between the idle and the deceleration phase for control of the spark advance mechanism.

It is a fourth object of the invention to provide mechanism wherein the discrimination between the idle and deceleration phases is effected on the basis of the engine speed.

It is a fifth object of the invention to utilize an incident of the engine speed as an actuating means in the operation of an ignition control device.

It is a sixth object of the invention to teach the advantage of using the port in the carburetor on the upstream side of the throttle butterfly to control the suction actuated spark advance mechanism and then switching to a port downstream of the carburetor throttle butterfly to have engine manifold suction control at higher speed accelerations by a suction operated advance mechanism.

A seventh object of the invention is the use of pressures developed in the water pump of the engine to switch from the carburetor vacuum (suction) advance control port to the intake manifold suction to control the suction operated spark advance at a predetermined engine speed.

An eighth object of the invention is to get away from the use of an above idle suction to differentiate between closed throttle idle and closed throttle decelerations at engine speeds above idle.

A ninth object is to use an inertia weight to sense deceleration for spark advance control.

A tenth object of the invention is to provide an effective inexpensive valve and control to effect the switching set forth in the sixth and seventh object.

An eleventh objective of the present invention is to provide controls for the spark timing of an internal combustion engine which are readily adaptable to existing engine designs as a possible control of exhaust emissions on cars presently in use.

A twelfth object of the invention is the use of a pendulum to sense decelerations to control the suction to the suction operated spark advance mechanism.

It is also an objective of the present invention to provide controls for the spark timing of an automotive internal combustion engine during engine operating conditions correspoding to the driving modes of "idle" and "deceleration."

A further objective of this invention is to provide spark timing controls which differentiate between engine operating conditions corresponding to "idle" and "deceleration" in an automotive vehicle by the use of an engine speed sensor.

These and other objectives and advantages will be more particularly set forth in the following description of a preferred embodiment in connection with the drawings in which:

FIG. 1 shows one form of the invention partly in elevation, partly in suction, and partly diagrammatic.

FIG. 2 shows a portion of FIG. 1 but with a check valve added.

FIG. 3 shows a view similar to FIG. 1 of another form of the invention.

FIG. 4 shows a variant of the embodiment in FIG. 3 with a check valve added.

FIG. 5 shows a portion of the structure of FIG. 3 with a differing type of valve coming within the scope of this invention.

In all figures like numerals refer to corresponding parts.

The representation in the drawings has been simplified to facilitate the understanding by utilizing diagrammatic illustrations for many components.

FIG. 1 shows a conventional distributor 1, which may be adjusted for advance by rotating a breaker plate by means of an air motor 2, or by rotating the distributor. Air motor 2 comprises an air tight chamber 3a in which a diaphragm 3 is normally forced to the right (as seen in FIG. 1) by a spring 4. A rod 5 connects diaphragm 2 with an arm 6 of the distributor which may either control the rotation of the distributor or the braker plate therein to effect a suction controlled spark advanced beyond that supplied by the governor spark advance not shown but usually located between the drive shaft to the distributor and the cam located on the cap side of the breaker plate. Suction is applied to the chamber 3a through a port 2a. When the suction so admitted is strong enough to overcome the force of the spring 4 which is usually equal to a suction of 4" Hg plus or minus against the stop formed by the tuned up edges of housing 2 against the washers on the distributor side of diaphragm 3, the distributor in the breaker plate is adjusted, in counter-clockwise rotation, from the shown normal adjustment to vacuum advance position to one of the other adjustments depending on the ratio of spring 4 rate and suction force on the washers on diaphragm 3. Sometimes this suction is in the range of 4"–11" Hg.

FIG. 1 further shows part of a conventional carburetor 10, of the down-draft type. A throttle butterfly 11 is disposed in the throat or main air passage of the carburetor, mounted on a shaft 12, and it divides the throat into an upper part 10a and a lower part 10b. The throttle butterfly 11 is spring urged (not shown) into the "closed" position of FIG. 1 and may be rotated counter-clockwise, usually by means of a foot-operated accelerator pedal (not shown) to various slanting "open" positions, including a vertical "wide open" position. The right edge 11a of the throttle butterfly 11 is functionally related to a socalled carburetor spark advance port which may have various interior configurations, such as shown in Mallory, No. 2,532,069, dated Nov. 28, 1950, entitled "Ignition Timing Control for Internal-Combustion Engines." An idle fuel port 7a with flow controlled by a fuel adjustment screw 7c is provided in usual form. In the operation of the engine, when the throttle butterfly is in the shown "closed" position, for idling or deceleration, there is for practical purposes atmospheric pressure in the upper chamber 10a, port 7 and manifold suction in the lower chamber 10b. The float bowl and idle fuel circuit to adjustment 7c is not shown.

FIG. 1 further shows a centrifugal type water pump 24 having an intake duct 26 leading to the center of rotor 23 and a discharge duct 27 which may be connected directly into the engine water jacket. The rotor is driven by the engine crank shaft by pulley 40, belt 41, water pump pulley 42. Idler pulley 43 may drive accessory such as generator 44. Water is moved by means of said rotor 23. In this process, water follows the perimeter of the rotor 23 at a velocity which is in approximate relation to the speed of rotation of crankshaft pulley 40 almost independently of the action of the thermostat radiator pressure cap. A pitot tube 22 which is placed near the rim 23a picks the velocity head of such water at the rim of rotor 23. The pressure from the water pump pitot is conducted by tube 22 to one side of diaphragm 19. Tube 25 connects the intake 26 to the pump to the other side of diaphragm 19. This pressure differential on each side of diaphragm 19 will vary with the speed of the water pump, which is analogous to the speed of the engine, and thus affords an index of the engine speed at any given time, so that the action of the thermostat that controls the flow of the cooling water through intake 26 will not affect the velocity of water following the rim of rotor 23, as discussed in my U.S. Patent No. 3,204,620, filed Sept. 7, 1965, entitled "Speed Sensing Device," inventor: Brooks Walker.

FIG. 1 further shows a shift valve 17 which may be described as one of the principal elements of the inventive concept. Shift valve 17 essentially comprises an upper chamber 17a and a lower chamber 17b which communicates by a transfer chamber 13 and has open termini 13b resp. 13c forming valve seats between which a valve plate 17c alternates as described below. Valve plate 17c is attached by a pin 30 to a valve stem 17d which is guided in the lower chamber 17b by means of a loosely fitting (not necessarily air tight) guide 28. An air seal may be provided by an O-ring 29a disposed within a sealing ring 29 or any other suitable seal may be used. The valve stem 17d terminates in a diaphragm 19 and is normally forced downward by a spring 18 which is disposed between the sealing ring 29b and the washers 19a and the diaphragm 19 in a housing 20. Washer 19b is secured to the under side of diaphragm 19 and to valve stem 17d by washer 17c or other suitable means.

In the engine idle position (low engine speed) of the shift valve 17, as illustrated in FIG. 1 the valve plate 17c makes air tight contact with the lower valve seat 13c. This provides a connection between port 7, per hose lead 14, port 14a, upper chamber 17a, past valve plate 17c, valve seat 13b, port 15a, hose lead 15, port 2a, to the chamber 3a. Whether the suction line so opened will have any effect upon the diaphragm 3 and, ultimately, upon the adjustment of the distributor 1, or the breaker plate therein, depends upon the considerations developed below. In the condition of the shift valve 17, as shown in FIG. 1, there is no communication of suction past the lower valve seat 13c and the valve plate 17c, so that the other suction line, which begins at port 9 and passes per hose lead 16, port 16a into the lower chamber 17b, is blocked.

It is obvious from previous description that the suction line from port 9 would be continued to diaphragm 3 if the speed of the water pump 24 were high enough to create a pressure differential between the lower chamber 20a and the upper chamber 20b in the housing 20 sufficient to overcome the speed selecting spring 18. In that event, the suction line beginning at port 7 would be cut off by the valve plate 17c making contact with the valve seat 13b and port 9 communicating with intake manifold suction would be connected to suction actuated spark advance 2.

As will appear from the following description of the operation of the mechanism according to the invention, the parts just described will co-function in a manner adapted to produce:

(1) No suction operated advance at idle as there is no suction at idle with throttle 11 on the engine (downstream) side of port 7 and valve disc 17c closed on seat 13c at idle speeds.

(2) Suction from port 9 operates normal suction operated spark advance at cruises and acceleration as port 9 will be connected to motor 2 by valve disc 17c closing on seat 13b and opening flow past lower seat 13c at cruise speeds above idle.

(3) On closed throttle decelerations above the speed when valve disc moves to open flow past seat 13c from port 9 and closes flow past seat 13b to port 7 (which is open to substantial atmosphere with throttle 11 closed to idle position) full manifold suction will be developed to advance motor 2.

OPERATION

As has been explained above, it is desirable to have no suction operated vacuum advance of the spark setting during the idle phase and to advance it during deceleration at closed throttle or idle throttle setting. The mechanism according to the invention, as explained, makes it possible to achieve these objectives without the possible troubles encountered if a higher than idle suction is used to differentiate between a closed throttle idle and a closed throttle deceleration with the interference caused by large barometric changes or barometric changes due to altitude changes.

With this device when the throttle moves from the idle position to part or full load, port 7 is immediately subject to the intake manifold suction so a corresponding "vacuum advance" is achieved by motor 2 by suction passing from port 9 as throttle edge 11a moves up then past. When the engine speed moves valve disc 17c to close on seat 13b and open flow past seat 13c, intake manifold suction will still control motor 2, as both port 7 and port 9 are subject to intake manifold suction.

On closed throttle decelerations, as soon as the engine speed drops through the critical range of 900-1200 r.p.m., the valve plate 17c reverts to close on the lower valve seat 13c and the suction from port 9 is cut off and opened from port 7 past seat 13b to motor 2 so that the diaphragm 3 is subjected to the control suction of port 7 which at that time is substantially atmospheric, i.e. has no suction, so that the distributor will be adjusted to no "vacuum advance" position for idle operation.

When driving under power at the range of 9-1200 when the valve 17c may be adjusted to switch the same suction exists at port 7 as at port 9 as throttle 11 is upstream from port 7 at cruises so the transition of valve 17c from closing on seat 13c to closing on seat 13b produces no "vacuum advance" change by motor 2. When decelerating from, say, 2000 r.p.m. to 1000, the vacuum advance will be full but after valve 17c closes on seat 13c to cut off flow from port 9 and connect port 7 to motor 2 there will be no suction advance by motor 2 for reduced exhaust emissions during deceleration below 1000 and idle.

FIG. 2 shows an alternate application of the inventive concept which has been explained in reference to FIG. 1. A check valve 31 with ball 32 is interposed in the suction line leading from the port 7. The valve seat 13b of FIG. 1 has been deprieved of its valve quality by cutting its edge obliquely or notching so that it now functions merely as an upward stop 34 for the valve plate 17c, if desired. A bleed hole 33 is provided in the wall of the valve chamber 13 of very small volume to allow diaphragm 3 to return to the no suction position in a short time, say, one second plus or minus, and yet not seriously interfere with the anti-smog lean fuel air mixture. This alternate embodiment performs the same function as that of FIG. 1 but only requires one valve face and allows the use of a simple open and closed valve by the speed sensor in place of the more complicated two-way valve. When the valve plate 17c moves upward, suction from port 9 is communicated to the diaphragm 3, with the check valve 31 preventing substantial loss of suction to port 7 when exposed to atmospheric pressure as on closed throttle deceleration. The bleed hole 33 is effective to bleed off accumulated suction in the chamber 3a (FIG. 1) during the idle operation described previously when suction from port 9 is cut off by valve 17c closing on seat 13c.

FIG. 3 shows a further alternate embodiment of the inventive concept. The shift valve 17 is disposed on connecting element 35 between two parallel plates, of which only one is shown as plate 35a and which are otherwise kept in alignment by studs or connectors 45. The valve stem 17d passes through a hole 36 in the connecting element 35 and is associated with an arm 38a of a bellcrank 38 which pivots on a shaft 37 and carries at its lower end a bob 39. Under all conditions, except deceleration, or when the car and engine are facing downhill, the bob 39 either hangs freely or is kept in its normal position, as shown in FIG. 3. An opposed point 39a and indicator 39b may be used for adjustment, etc., if desired. A screw 42 in a bracket 31 may have a soft face 42a as non-metallic to reduce noise on contact and limit the swing of bob 39 to the right, as viewed in FIG. 3. Upon deceleration or downhill, the bob 39 swings under the urging of its inertia clockwise, against the stop screw 43 in a bracket 44 which may have non-metallic face 43a. The spring 18 has been shifted from the position shown in FIG. 1 to under guide 28 where it perfoms the same function but may be adjusted by nut 17e through opening 17f. The operation of the embodiment of FIG. 3 is in effect the same as that previously described. In the idle phase, the bob 39 is in the normal position nad diaphragm 3 is under the control of port 7 which then has no suction, so that the distributor is in the no "vacuum advance" position. Upon acceleration, the bob 39 is kept in the normal position by the screw 42 and the diaphragm 3 is under the control of the suction at port 7 which is manifold suction with butterfly 11 above port 4, as viewed in FIG. 3 if butterfly 11 were open. The situation at cruise is the same, since the bob 39 then hangs freely in the normal position, as shown. Upon deceleration or downhill, the bob 39 swings clockwise and lifts the valve plate 17c against the force of the spring 18. The diaphragm 3 is then under the control of the suction of port 9 or full deceleration manifold suction.

FIG. 4 shows the embodiment of FIG. 2 combined with the embodiment of FIG. 3. The parts correspond to those of the two previous figures and function in the same manner, and require only a single open and closed valve open from 9 to diaphragm 3 on deceleration while port 9 controls when at idle for no vacuum advance at idle and full vacuum advance at deceleration with a closed throttle as check valve 32 prevents bleeding to atmosphere through port 7. Adjustment screw 33a may adjust the bleed to a minimum consistent with desired speed of motion of diaphragm 3 to no advance on idle.

FIG. 5 shows a different type of valve with a limited air bleed 33b open when valve stem 17 is down with valve disc 17c closed on seat 13c at speeds below, say, 1000 r.p.m., for no suction actuated spark advance at these lower speeds. Above 1000 r.p.m. plus or minus, valve 17c will raise to open flow past seat 13c from port 9 to diaphragm 2 for intake suction actuated spark advance and full suction actuated spark advance at closed throttle decelerations and no need to connect to a port such as with automatic transmissions the engine generally gets above 1000 before much power is developed to drive the wheels so normal vacuum advance will be available for all driving while still having no vacuum controlled advance at idle and full vacuum controlled advance at decelerations with closed throttle. This valve could be used with actuation, as shown in FIGS. 1 or 3. At full throttle there is no "vacuum advance" or normal full throttle vacuum advance so no loss in passing or maximum power.

I have illustrated my inventions in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim as my invention:

1. In combination, an engine having a carburetor, a throttle valve, an intake manifold, a suction actuated spark advance mechanism, in which said engine has a first port on the engine side of said throttle valve, said first port passing suction to said suction operated spark advance mechanism on closed throttle decelerations above a predetermined engine speed, an engine speed sensor, a sensor valve, said speed sensor closing a portion of said sensor valve to colse flow from said first port to said suction actuated spark advance mechanism so that engine intake suction normally available to pass said first port will not be passed to said suction actuated spark advance mechanism below a predetermined engine speed as sensed by said speed sensor so as to have no suction operated spark advance at engine idle operation below a speed sensed by said speed sensor.

2. A device as described in claim 1, in which there is a second port through said carburetor on the upstream side of said throttle valve near the farthest upstream edge of said throttle valve, said sensor switching said sensor valve to a first postiion to connect said first port to said suction actuated advance mechanism above a predetermined engine speed, a second position of said sensor valve also controlled by said speed sensor so that said second port and sensor valve provide for no vacuum advance at closed throttle idle when the second port is connected to said vacuum actuated advance mechanism this second port also providing normal spark advance by said suction operated mechanism when the sensor valve is in the second position at part throttle lugging at idle speeds for better lugging power, said first port, when connected by said first position of said sensor valve to said suction actuated advance mechanism, provides suction actuated spark advance at closed throttle decelerations above a predetermined engine speed as determined by said speed sensor for reduced exhaust emissions.

3. A structure as defined in claim 1, said carburetor having a second port on the upstream side of said throttle, conduit means connecting said second port to the said mechanism for controlling said suction actuated spark advance to no suction actuated spark advance at closed throttle idle operation, said speed sensor actuating said valve to connect fluid flow from said first port to said suction actuated spark advance mechanism above engine idle speed and, as sensed by said speed sensor, for normal suction actuated spark advance above idle speeds and full suction operated spark advance at closed throttle decelerations, said second port providing normal suction operated spark advance at part throttle lugging engine operation at or below engine idle speeds as determined by said speed sensor.

4. A device as described in claim 1, in which said engine has a water pump, said speed sensor operating on pressures developed in said water pump while said engine is operating at idle or higher engine speeds.

5. A device as defined in claim 4, said water pump including a pitot tube, a rotor, the pressure of water in said pitot tube being a pressure utilized by said speed sensor.

6. An engine having a carburetor an intake manifold, a throttle, a distributor for spark ignition, a suction actuated distributor spark advance mechanism, an engine speed sensor, means actuated by said speed sensor to control engine developed suction from said intake manifold to said mechanism so that there is no suction actuated spark advance at closed throttle idle and full suction actuated spark advance at closed throttle deceleration above a predetermined engine speed.

7. A spark control device for an internal combustion engine having an intake manifold, a spark advance mechanism, a suction actuated motor for opearting said mechanism to control the timing of the spark, a carburetor, and a throtttle valve in said carburetor for movement between an idle position for restricting flow of fluid through the carburetor and an open position for permitting flow of fluid therethrough, a first means responsive to a first preselected engine speed and idle throttle valve position to prevent application of engine developed suction to said suction operated motor, a second means responsive to a second preselected speed greater than said first speed and closed throttle valve to supply engine developed suction to said motor, and a third means responsive to said second speed and open throttle valve to supply engine developed suction to said motor.

8. A device as defined in claim 7 wherein said first, second and third means comprises a pair of spaced ports in said carburetor on opposite sides of said throttle valve when in the engine idle position communicating one of said ports to atmosphere and the other of said ports to an intake manifold and a sensor valve responsive to the said first speed of the engine for connecting only said one of the ports to the suction actuated motor and responsive to the said second speed for connecting only the said other of the ports to the motor.

References Cited

UNITED STATES PATENTS

| 2,867,197 | 1/1959 | McCollough. |
| 3,204,620 | 10/1963 | Walker _____ 123—103 XR |
| 3,272,191 | 9/1966 | Walker. |

WENDELL E. BURNS, Primary Examiner

U.S. Cl. X.R.
123—117, 146.5